Dec. 12, 1961  H. NIEDERS  3,013,190
HERMETIC SEAL TYPE VENT FOR ELECTROLYTIC CAPACITORS
Filed Dec. 23, 1957

INVENTOR.
Harold Nieders
BY
ATTORNEY

United States Patent Office 3,013,190
Patented Dec. 12, 1961

3,013,190
HERMETIC SEAL TYPE VENT FOR ELECTROLYTIC CAPACITORS
Harold Nieders, Indianapolis, Ind., assignor to P. R. Mallory & Co., Inc., Indianapolis, Ind., a corporation of Delaware
Filed Dec. 23, 1957, Ser. No. 704,520
7 Claims. (Cl. 317—230)

This invention relates to electrolytic devices and more particularly to electrolytic capacitors of the type having vent means for relieving high gas pressures created within the same.

As is known, an electrolytic capacitor sealed into a plastic or metal container forms a gas due to decomposition of the electrolyte, with or without voltage being applied. During normal use this gas pressure must be confined by the capacitor housing or container, for, relieving this amount of gas pressure would necessitate puncturing the containers in some manner thereby exposing the capacitor to the ingress of atmospheric moisture and temperature conditions harmful to the further operation of the unit. Under normal use and conditions these gas pressures are nominal. However, if the capacitor section malfunctions, there is an excessive build-up of gas pressure at an exceedingly rapid rate which if not relieved would cause the unit to explode with greatly undesirable results to surrounding equipment and units. The purpose of a vent to relieve the abnormal gas pressure so as to prevent an explosion of the unit, is thus mandatory.

Various types of vents in common use are solder, cork, rubber gasket and a combination gasket-fibre-board or plastic. All of these vents have one or two disadvantages. First, they do not hermetically seal the capacitor housing prior to venting and second, they vent irregularly, non-uniformly or not at all. The object of this invention is therefore to provide a vent which will hermetically seal the capacitor container or housing. It will also vent uniformly within controllable pressure limits, if and when a malfunction occurs, thereby preventing an explosion or uncontrolled venting action which would destroy the unit and adjacent components in the equipment or circuitry on which it is being used. The positive action of this vent at a controlled low pressure would therefore prevent any damage to surrounding components.

The present invention therefore has as its prime object to provide a hermetic seal type vent for electrolytic capacitors.

Another object of the present invention is to provide a novel vent valve construction, which is very simple and cheap to manufacture, and at the same time is very reliable in operation.

Still another object of the present invention is to provide a molded synthetic rubber vent for an electrolytic capacitor, which vent will conform to a tapered aperture formed in the wall of the capacitor container so as to hermetically seal the same while the top end of said vent is adapted to rupture at a predetermined excessive internal pressure in said container.

Another object of the present invention is to decrease the danger due to explosion of electrolytic condensers.

In accordance with another feature of the present invention there is provided a pressure release means for an electrolytic capacitor.

Still another object of the invention is to provide a vent or safety plug in an aperture of a wall of a capacitor container, said vent being formed as a hollow cylinder of silicone rubber, the top surface of which has an integrally formed flap of the same material but of a determined thickness, and which is adapted to hermetically seal said aperture while providing means of egress of excessive gas pressure formed in said container during the operation of said capacitor.

Further objects and advantages of the present invention will be apparent from the following description, references being had to the accompanying drawings wherein a preferred form of the invention is shown.

Generally speaking the present invention of a vent for hermetically sealing an aperture in the wall of a capacitor mounting as well as providing a means of egress for the excessive gas pressure which might be formed therein, comprises a hollow cylindrical plug of molded silicone rubber with one end closed off. The closed end is of thin dimension and forms a diaphragm or puncture part of the plug. The venting pressure is determined by the material, size and shape of the diaphragm. Since the plug is molded, the dimensional tolerances on the diaphragm can be closely controlled.

Figure 1:
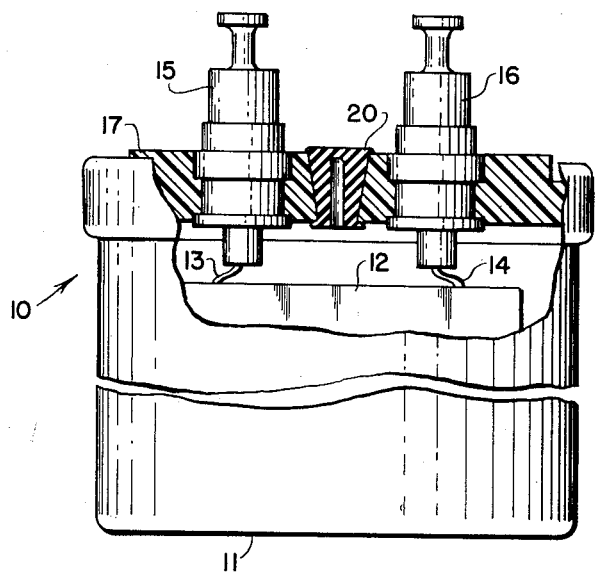
FIG. 1 is a cross sectional view of an electrolytic capacitor or condenser incorporating the subject of this invention.

Referring to the drawing, FIG. 1, illustrates the positional and cooperative arrangement of the vent which hermetically seals a capacitor 10 which includes container 11 in which there is placed a conventional electrolytic capacitor 12. Tabs 13 and 14, as usual, connect the capacitor to terminals 15, 16, which may be embedded in a cover, comprising a plate 17 of insulating material, for example, a phenolic condensation product. The cover plate is held in place by crimping the edge of the container about the cover.

Cover 17 has an aperture 18 formed therethrough of a predetermined tapered configuration which is wider at the top than at the bottom. The plug 20 for this aperture is in the form of a hollow cylinder as shown in FIG. 2.

Figure 2:
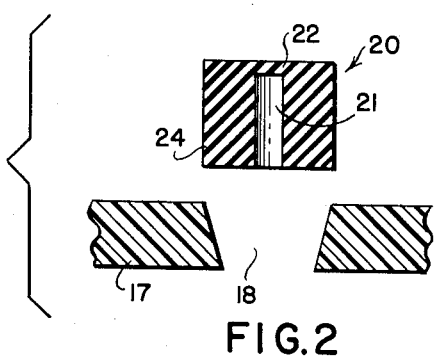
FIG. 2 is a cross sectional view of the silicone rubber plug and vent of the present invention as adapted to be inserted into the tapered hole of the container wall.
Figure 3:
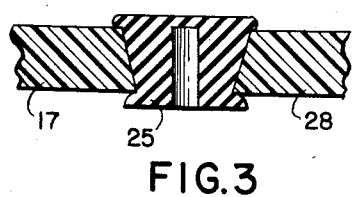
FIG. 3 is an amplified view of the vent plug.

The plug, as particularly shown and amplified in FIGS. 2 and 3 is by actual dimension about .312" long and of .187" cross sectional diameter. The central bore 21 of about .075" diameter extends therethrough for a distance of .302", leaving as a central diaphragm 22, a thickness of approximately .010". This thickness of the diaphragm 22 is sufficient to maintain normal pressure within the capacitor container, but will rupture at abnormal pressures produced therein.

As stated, plug 20 is adapted to be fitted within the tapered aperture of the capacitor cover plate. The tapered aperture compresses the outer wall 24 of the plug to attain a hermetic seal for the aperture. The tapered aperture is adapted to compress the silicone rubber of the plug by 10 to 20%. The silicone rubber piece extends through cover 17 of the container and is compressed such that upon emerging inside the container it forms a mushroom or anchoring portions 25 which protrude below the cover to be held against face 28 thereof so that it can not be forced out by internal gas pressure. Once it is placed in the position as shown in FIG. 3, diaphragm portion 22 will vent first under gas pressure. However, prior to any venting the plug effectively hermetically seals the capacitor housing or container.

While the form of the embodiment of the invention as herein disclosed constitutes a preferred form, it is to be understood that other forms might be adapted as may come within the scope of the claims which follow.

What is claimed is as follows:

1. The combination with a container adapted to enclose a device liable to develop excess gas during operation, said container including a top plate having a pair of electrical terminals passing therethrough, said terminals having connections to said device, said plate further having a tapered aperture formed completely therethrough, said aperture being wider at the top than at the bottom, a vent for said aperture comprising a cylinder having a bore, a top closed end, a bottom open end, said vent being placed into said aperture to completely seal the same, said top of said vent above said bore forming a thin diaphragm which is capable of being ruptured at a determined internal pressure, said bottom thereof forming a flange to hold said vent within said aperture solely thereby during said rupture.

2. The combination of a container adapted to enclose a capacitor device liable to develop excessive gas pressure during its operation, said container including a top plate having a pair of electrical terminals passing therethrough said terminals being connected internally to said capacitor, said plate further having a tapered aperture formed completely therethrough, said aperture being wider at the top than at the bottom, and a vent for said aperture comprising a cylinder having a bore centrally placed therein, a top end closing said bore, said vent being placed into said aperture, said top end of said bore forming a diaphragm, said tapered aperture compressing the outside wall of said vent, an end portion thereof forming sections anchoring the vent therein by gripping the bottom face of said plate, said vent thus hermetically sealing said aperture in said plate; the diaphragm thereof being ruptured only when abnormal gas pressure is formed in said container, said cylinder still remaining in said aperture.

3. The combination with a container adapted to enclose a device liable to develop excess gas during operation, said container including a top plate having a pair of electric terminals passing therethrough, said terminals having connections to said device, said plate further having a tapered aperture formed completely therethrough, said aperture being wider at the top than at the bottom, a vent for said aperture comprising a hollow cylinder, a top closed end, a bottom open end, said vent being placed into said aperture to be compressed into the same shape thereof, said top of said vent forming a thin flexible diaphragm which is capable of being ruptured at a determined internal pressure, said bottom of said vent forming a flange to hold said vent within said aperture solely thereby, said cylinder still remaining in said aperture.

4. The combination with a container adapted to enclose a device liable to develop excess gas during operation, said container including a top plate having a pair of electric terminals passing therethrough, said terminals having connections to said device, said plate further having a tapered aperture formed completely therethrough, said aperture being wider at the top than at the bottom, a vent compressed into said aperture comprising a silicone rubber cylinder having a bore centrally formed therein, a top closed end thereof, a bottom open end, said vent being placed into said aperture to completely seal the same, said top of said vent above said bore forming a thin integrally formed diaphragm which is capable of being ruptured at a determined internal pressure, said top of said vent sealing said aperture and said bottom thereof forming an anchoring flange to hold said vent within said aperture solely thereby, said cylinder being retained in said aperture during the rupture of said diaphragm.

5. The combination with a container adapted to enclose an electrolytic capacitor liable to develop excess gas during operation, said container including a top plate fabricated of an electrically insulative material having a pair of electric terminals passing therethrough, said terminals having connections to said device, said plate further having a tapered aperture penetrating the same said aperture being wider at the top than at the bottom, a silicone rubber vent for said aperture comprising a cylinder having a bore, a top closed end, a bottom open end, said vent being placed into said aperture to completely seal the same, said top of said vent above said bore forming a thin diaphragm which is capable of being ruptured at a determined internal pressure, said top of said vent and said bottom thereof forming a flange to hold said vent within said aperture solely thereby, said cylinder being retained in said aperture during said rupture of said diaphragm.

6. The combination with a container adapted to enclose an electrolytic capacitor liable to develop excess gas during operation, said container including a molded electrically insulative top plate having a pair of electrical terminals passing therethrough, said terminals having connections to said device, said plate further having a tapered aperture formed completely therethrough, said aperture being wider at the top than at the bottom, a silicone rubber vent for said aperture comprising a cylinder approximately .312" long having a central bore of .075" diameter, a top closed end therefor, a bottom open end, said vent being placed into said aperture to completely seal the same, said top of said vent above said bore forming a thin diaphragm having a thickness of approximately .010" which is capable of being ruptured at a determined internal pressure, said top of said vent and said bottom thereof forming a flange to hold said vent within said aperture solely thereby during said rupture of said diaphragm.

7. A venting plug for insertion in an aperture of a closure disc sealing the container of an electrolytic capacitor, said disc having upper and lower faces, respectively, said plug being a hollow cylindrical tube fabricated of silicone rubber, one end of said tube being closed by a thin diaphragm integrally joined to said tube, the aperture of said disc having a cross sectional diameter less than that of said plug, said plug adapted to fit within said aperture by compressing same, said compression of said plug forcing the ends of said plug outwardly against the faces of said disc to firmly hold the plug thereby within said aperture, said diaphragm of said plug capable of being ruptured only at a predetermined excessive gas pressure formed within said container, said plug being firmly held in said aperture during said rupture.

References Cited in the file of this patent
UNITED STATES PATENTS

| | | |
|---|---|---|
| 1,691,806 | Holland | Nov. 13, 1928 |
| 1,920,799 | Lilienfeld | Aug. 1, 1933 |
| 2,125,373 | Georgiev | Aug. 2, 1938 |
| 2,199,519 | Collins | May 7, 1940 |
| 2,211,780 | Jacobs | Aug. 20, 1940 |
| 2,766,408 | Georgiev | Oct. 9, 1956 |